Sept. 6, 1938.　　F. R. FAGEOL ET AL　　2,128,930
UNIT SECTION AUTOMOTIVE VEHICLE
Filed May 18, 1934　　9 Sheets-Sheet 1

Inventor
Frank R. Fageol
William B. Fageol
Strauch + Hoffman
Attorney

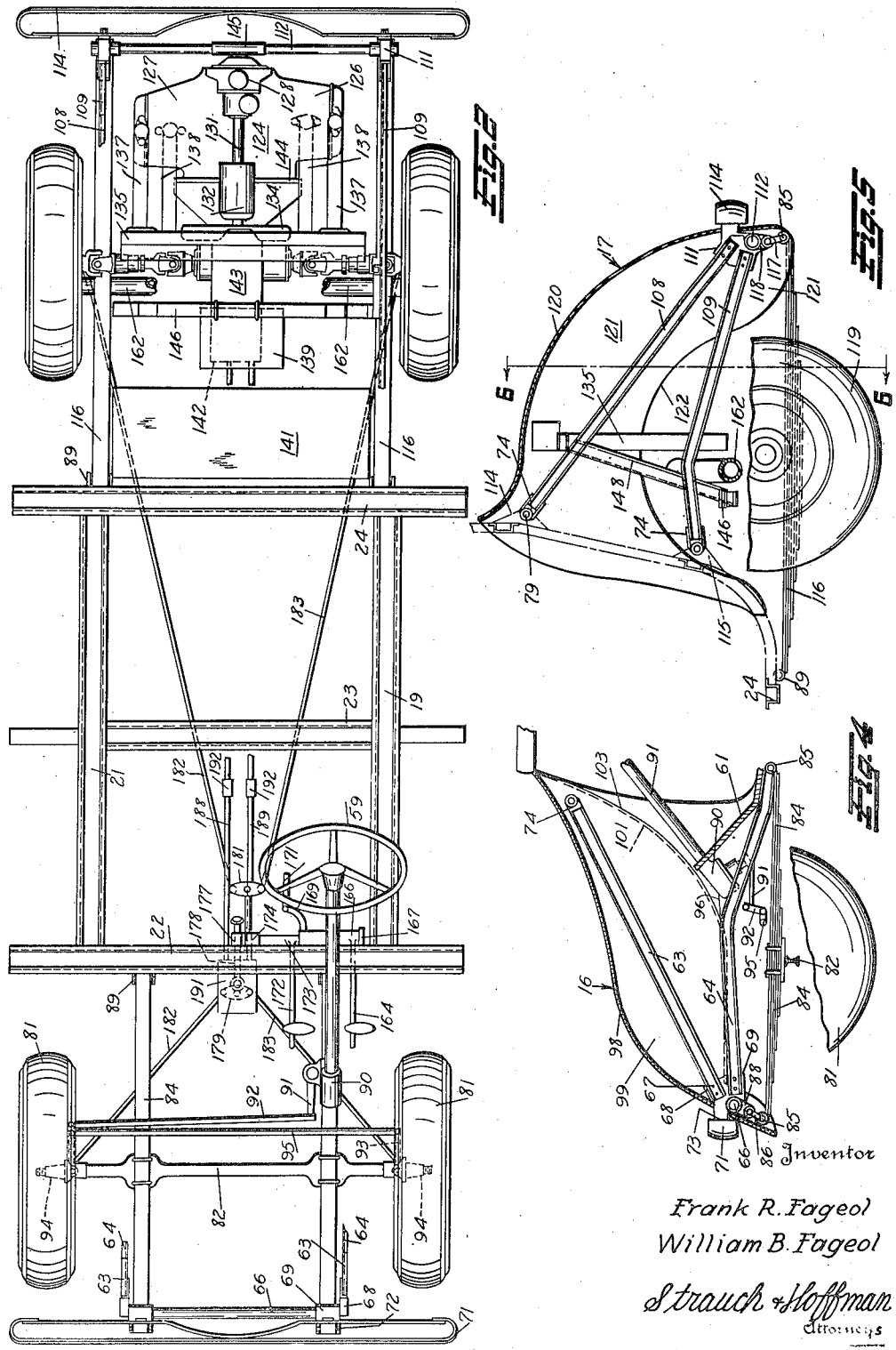

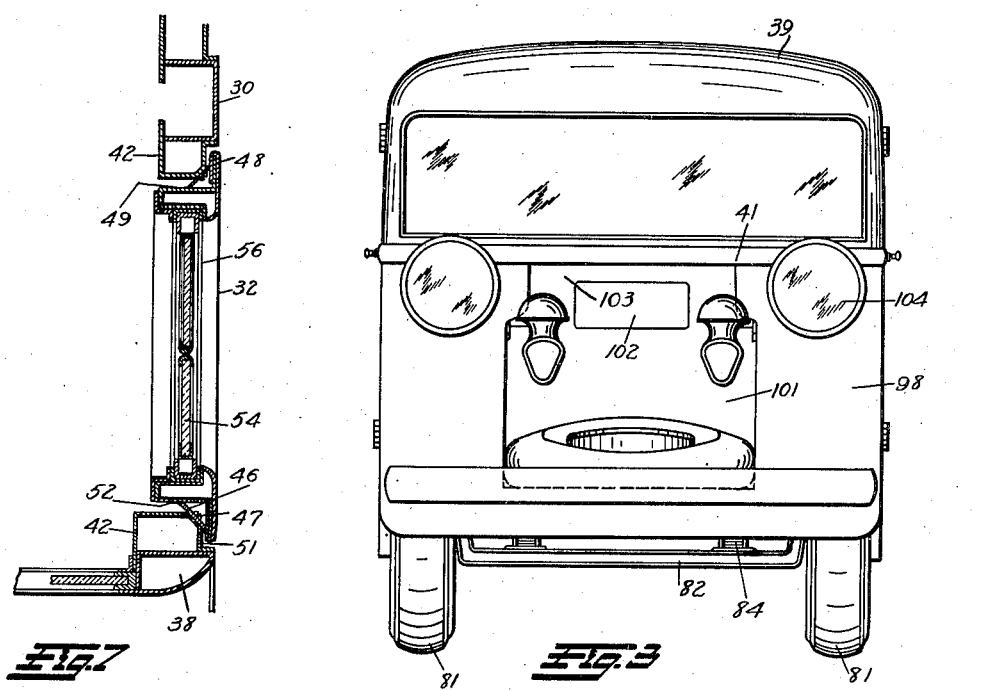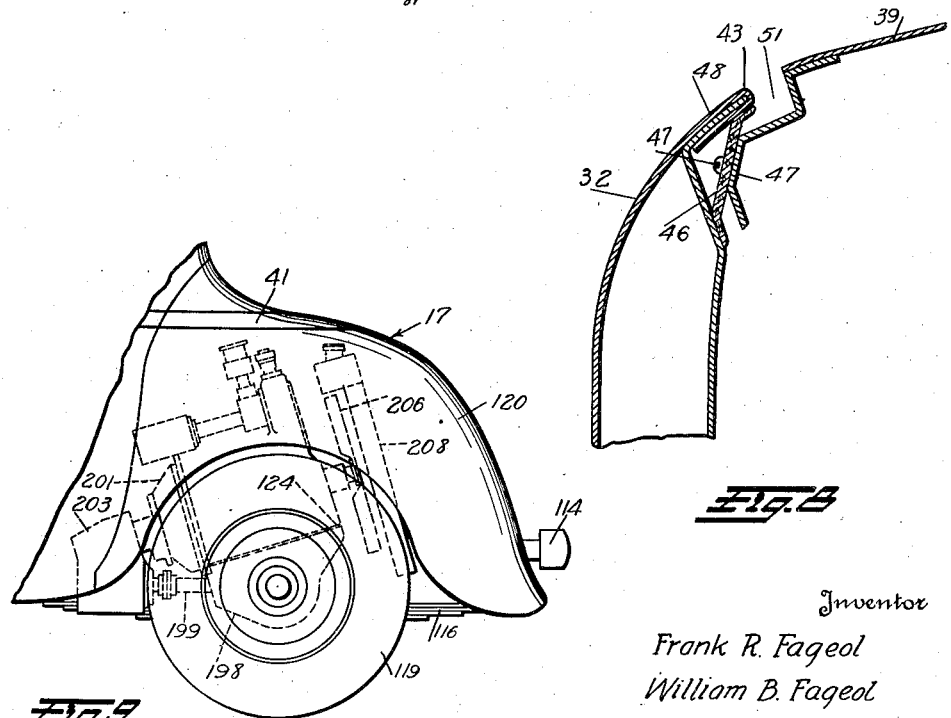

Sept. 6, 1938. F. R. FAGEOL ET AL 2,128,930
UNIT SECTION AUTOMOTIVE VEHICLE
Filed May 18, 1934 9 Sheets-Sheet 4

Inventor
Frank R. Fageol
William B. Fageol

By Strauch & Hoffman
Attorneys

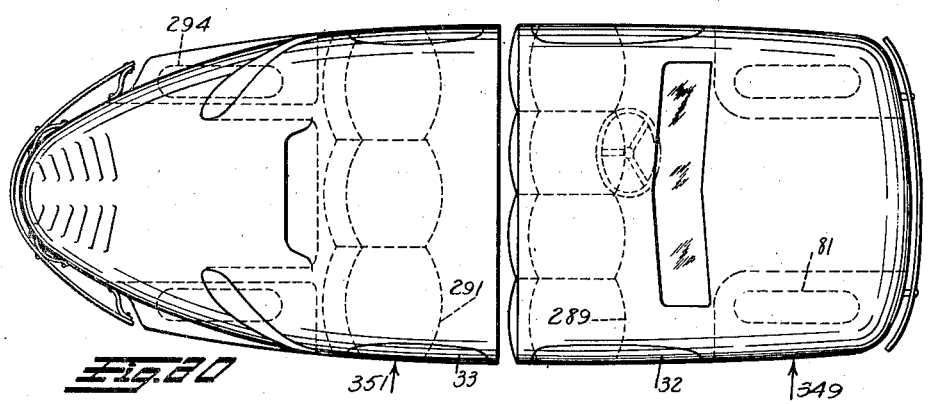
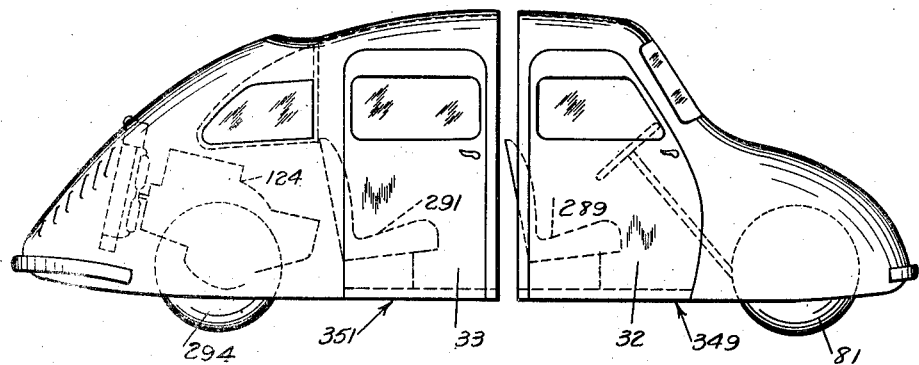
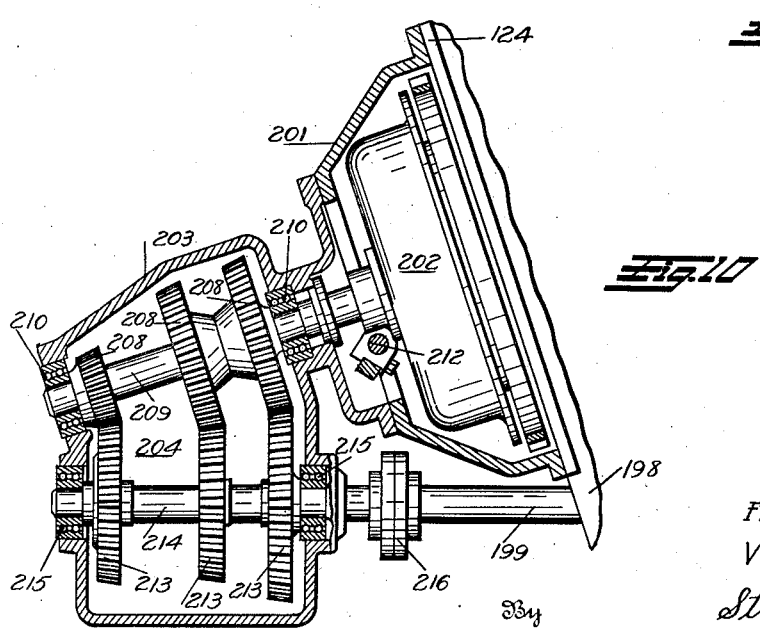

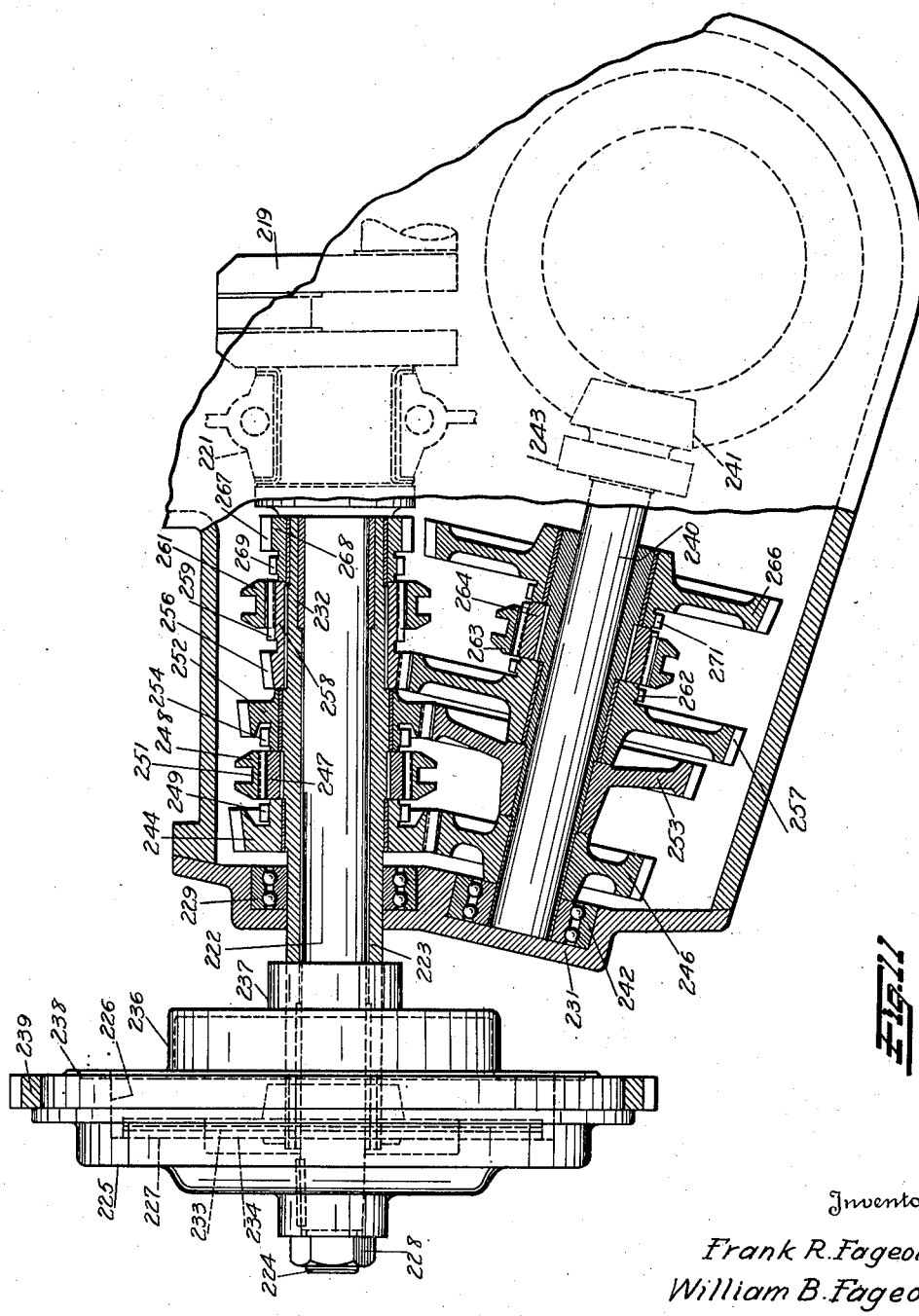

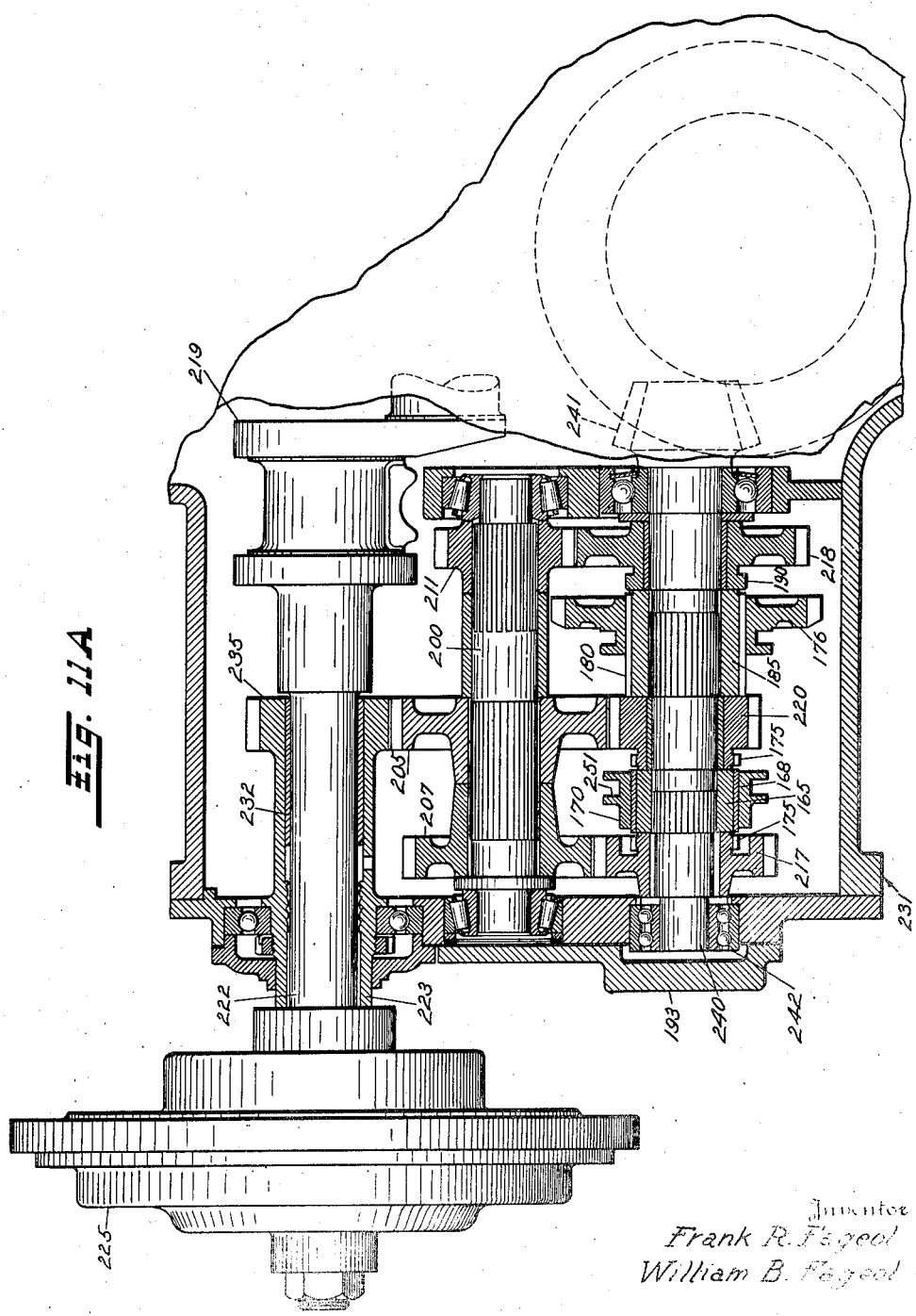

Sept. 6, 1938.  F. R. FAGEOL ET AL  2,128,930
UNIT SECTION AUTOMOTIVE VEHICLE
Filed May 18, 1934  9 Sheets-Sheet 8
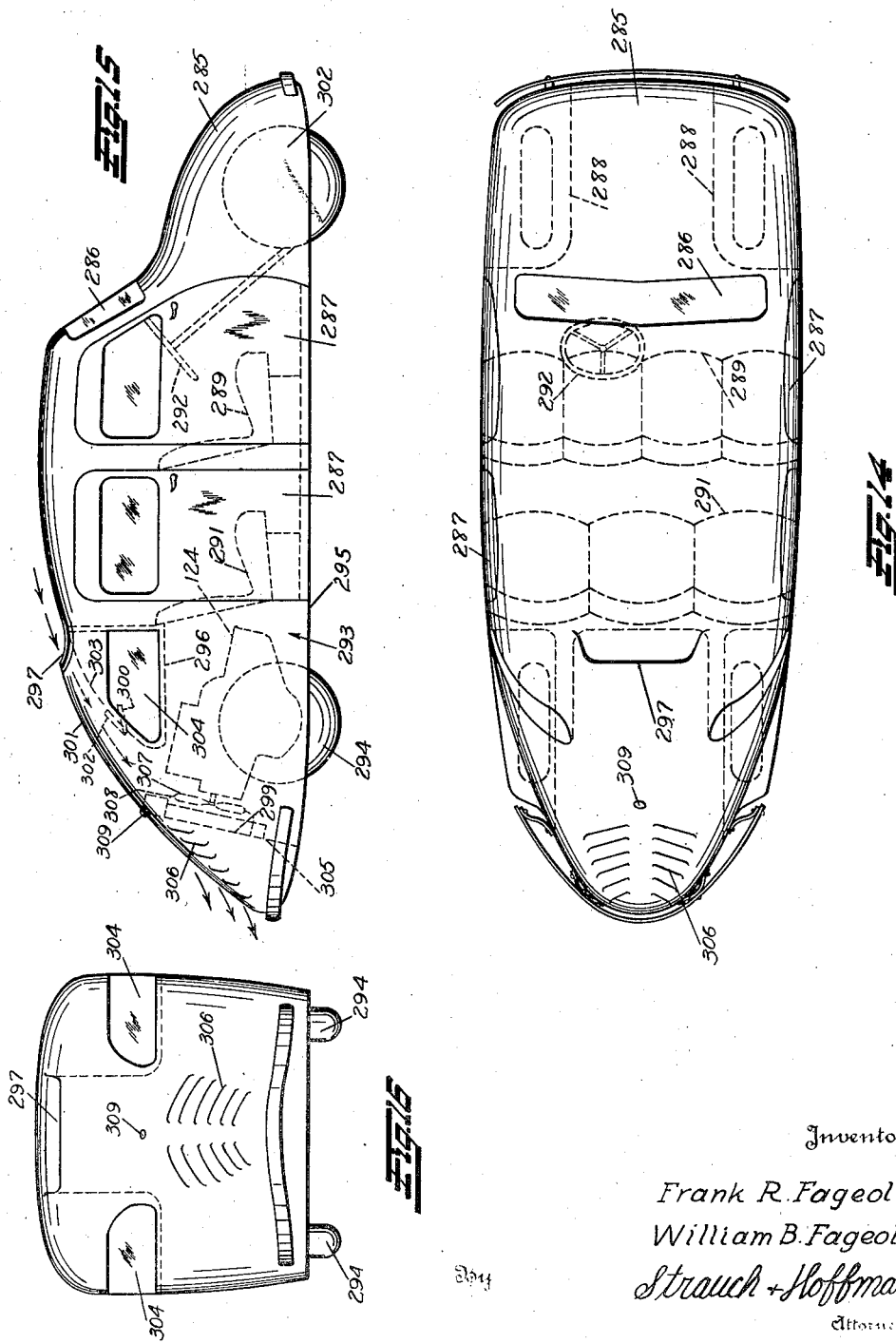
Inventor
Frank R. Fageol
William B. Fageol
Strauch + Hoffman
Attorneys Sept. 6, 1938.  F. R. FAGEOL ET AL  2,128,930
UNIT SECTION AUTOMOTIVE VEHICLE
Filed May 18, 1934  9 Sheets—Sheet 9
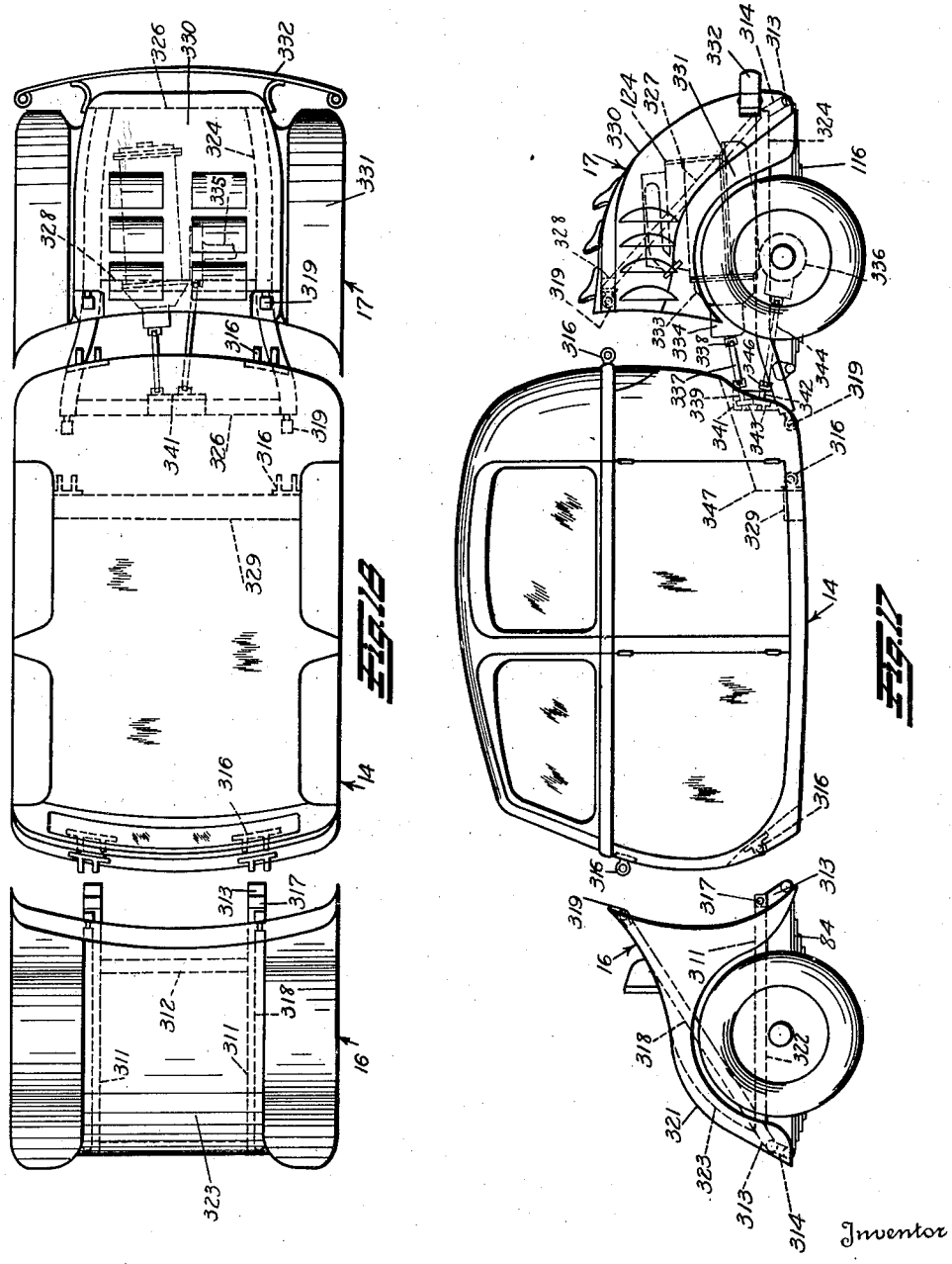
Inventor
Frank R. Fageol
William B. Fageol
By Strauch & Hoffman
Attorneys Patented Sept. 6, 1938

2,128,930

UNITED STATES PATENT OFFICE 2,128,930

UNIT SECTION AUTOMOTIVE VEHICLE

Frank R. Fageol and William B. Fageol, Kent, Ohio, assignors of one-fifth to Strauch & Hoffman, a partnership composed of William A. Strauch and James A. Hoffman, Washington, D. C.

Application May 18, 1934, Serial No. 726,418

12 Claims. (Cl. 180—54)

The present invention relates to automotive vehicles and is concerned more particularly with a vehicle of novel structure which may be produced and distributed with relatively small expense as compared with the costs of present day production and distribution methods.

The invention is also concerned with a novel propulsion system and the disposition on the vehicle of the mechanism comprising this system.

Automotive vehicles of the type in general use comprise a chassis which carries the driving motor and its accessories and is spring supported on the vehicle wheels and axles. The body of the vehicle which provides space and accommodations for the carrying of passengers or merchandise is mounted on the chassis and does not add to the strength of the complete vehicle. Such vehicles of the foregoing type are comparatively expensive to manufacture and assemble as the assembly of the vehicle as a whole must be completed at a place where special tools and facilities are available. The place of final assembly of the individual parts of the vehicle is usually at the manufacturing plant or at a branch plant to which the unassembled parts of the vehicle are shipped. This practice adds to the cost of manufacture relatively large costs for assembly.

Another form of automotive vehicle which departs somewhat from the common form mentioned, has a body which houses and supports the driving motor and its accessories. The body, so equipped, is directly supported on the vehicle axles by springs without the use of a separate chassis or load bearing frame. This improved form of vehicle is also generally assembled at the place of manufacture.

The primary object of the present invention is to provide a novel vehicle of light weight and relatively small bulk having ample space for accommodating passengers or merchandise and which is inexpensive to manufacture and distribute to the purchaser by methods not heretofore deemed feasible.

Another and related object of our invention is to provide a novel vehicle composed of a plurality of detachable units or sections, each of which is complete and distinctly novel in itself and interchangeable with like sections of the vehicle. This is an important feature of our invention since so far as we are aware, we are the first to provide a vehicle assembled as a whole, from detachable interchangeable units. This permits the removal of the separate units for repairs and service and the replacement thereof with interchangeable units in operation without removing the vehicle as a whole from service.

A further object of the present invention is to provide a novel vehicle having a separate body, providing roomy and comfortable space for accommodation of a driver and passengers or merchandise, which is constructed as a complete unit adapted to be supported between detachable individual units, each comprising an axle and road wheels and each readily removable for repair and servicing and adapted for replacement by similar units whereby the time of removal of the vehicle from service for repairs is minimized and the efficiency of operation is considerably increased thereby providing a vehicle especially adapted for low cost rental taxicab and individual transportation purposes.

It is also contemplated to provide an axle and pair of road wheels for the body section or unit so that the addition of one section or unit, equipped with a driving motor, will provide a complete two unit vehicle. Therefore, it is still another object of the present invention to provide a novel vehicle having a wheel supported body and an independent wheel supported driving unit rigidly or flexibly coupled to the body.

The central or body unit of the novel vehicle of our invention, providing the housed load carrying space within the vehicle, may be made in finally finished sections and assembled at a place other than the place of manufacture by unskilled labor without special equipment and at low cost. In making up the sections of the body unit the exterior finish and the interior decorations and the trim may be applied in advance of assembly of the sections to form the complete body unit so that no skilled finishing operations are required after final assembly.

Accordingly, it is a further object of the present invention to provide a vehicle body unit of the kind contemplated by the present invention, constructed of separate sections which are trimmed and finished in advance of their assembly to form the body unit and may be rapidly assembled at low cost by unskilled labor.

It is a still further object of the present invention to provide, in a novel vehicle, a wheel mounted unit which is equipped with steering apparatus and is adapted to be detachably connected to an adjoining body unit in the formation of a complete rigid vehicle made up of interchangeable units and readily replaceable units.

Still another object of the present invention is to provide in a novel vehicle, a readily detachable and replaceable interchangeable unit comprising the driving motor of the vehicle and the appurtenant transmission and control mechanism which is adapted to be rigidly connected to an adjoining body unit.

Still another object of the present invention is to provide a novel vehicle having a low floor level, occupying substantially the full width of the vehicle, which may be conveniently reached directly by the vehicle occupants without the aid of an auxiliary step or running board.

Still another object of the present invention is to provide a novel vehicle having a low floor level and center of gravity, and a low passenger carrying compartment occupying substantially the entire width of the vehicle to which access is had through door openings in the sides and roof of the body, these openings extending upwardly from the floor line of the vehicle and horizontally into the roof.

Still another object of the present invention is to provide a vehicle passenger compartment door which extends upwardly from the floor line of a low passenger compartment in the plane of the body side and which is curved inwardly at the top to follow the roof line of the vehicle whereby a passenger may enter the low compartment with less stooping.

Still another object of the present invention is to provide a novel leak proof sealing means for a vehicle door whereby a continuous seal is provided for the joints at the edges of the door and water from above the door is prevented from flowing over the surface of the door onto the windows thereof.

Still another object of the present invention is to provide a novel steering arrangement for a vehicle in which the stationary mechanism is directly connected to one of the dirigibly mounted vehicle axles.

Another and related object of the present invention is to provide a novel means for permitting relative movement between the vehicle steering gear and the wheel carrying axle as the vehicle springs deflect in cushioning road shocks.

A further and related object of the present invention is to provide a novel means for imparting steering movements to the dirigibly mounted road wheels of a vehicle from the pitman arm of the vehicle steering mechanism, comprising an extensible link interconnecting the pitman arm and the interconnected wheel carrying axles, the connection of the link to one wheel carrying axle restricting relative pivotal movement between the link and the axle to a vertical plane passing through the axis of rotation of the wheel, and the connection of the link to the pitman arm of the vehicle steering mechanism permitting substantially universal pivotal movement of the link with respect thereto.

Still another object of the present invention is to provide a novel driving system for an automotive vehicle in which the axis of the vehicle drive wheels lies substantially midway of the length of the vehicle driving motor.

A still further object of the present invention is to provide a novel driving system for an automotive vehicle in which the vehicle driving motor and the power transmission mechanism are disposed over the driving wheel axis of the vehicle with the greater part of the weight of the motor and transmission mechanism disposed to one side of the axis of the vehicle drive wheels.

Another object of the present invention is to provide a novel driving system for an automotive vehicle in which the vehicle driving motor is disposed over the axis of the rear wheels of the vehicle in a novel manner and imparts its driving force thereto through a driving mechanism of unitary structure with said engine.

Still another object of the present invention is to provide novel cooling means for the internal combustion engine of an automative vehicle whereby cooling air for the driving engine is drawn within the body between spaced walls thereof.

Further objects of our invention will appear in the following disclosure of preferred forms of our invention and are defined by the terms of the appended claims.

Referring to the drawings in which like reference characters indicate like parts:

Figure 2 is a view in plan of the vehicle of Figure 1 with certain of the structural elements thereof disclosing the arrangement of the driving mechanism and control connections, the enclosing walls of the body being omitted for the sake of clearness of illustration.

Figure 3 is a front end elevational view of the vehicle of Figure 1.

Figure 4 is a view in vertical section of the forward detachable unit of the vehicle of Figure 1.

Figure 5 is a vertical sectional view of the rear detachable unit of the vehicle of Figure 1.

Figure 7 is a fragmentary horizontal sectional view on line 7—7 of Figure 1 showing details of the body frame and door closure.

Figure 8 is a fragmentary vertical sectional view on line 8—8 of Figure 1 showing the door closure at the roof.

Figure 9 is a view in elevation showing a modified form of drive mechanism installed in a unit similar to that shown by Figure 5.

Figure 10 is a fragmentary elevational view partly in section showing details of the novel drive mechanism of Figure 9.

Figure 11 is a view taken partly in section illustrating a further modified form of drive mechanism especially suited for installation in vehicles embodying our invention.

Figure 11A is a view taken partly in section illustrating another modified form of drive mechanism similar to that illustrated by Figure 11.

Figures 14, 15 and 16 are plan, side and rear views respectively of a modified form of vehicle embodying the present invention.

Figure 17 is a view in elevation of another modified form of vehicle embodying our invention showing the several unit sections thereof detached from each other.

Figure 18 is a view in plan of the vehicle of Figure 17 also showing the several sections in detached relationship.

Figure 19 is a view in elevation of still another modified form of vehicle embodying our invention comprising two unit sections, shown as being detached from each other.

Figure 20 is a view in plan of the vehicle of Figure 19.

Figure 1:
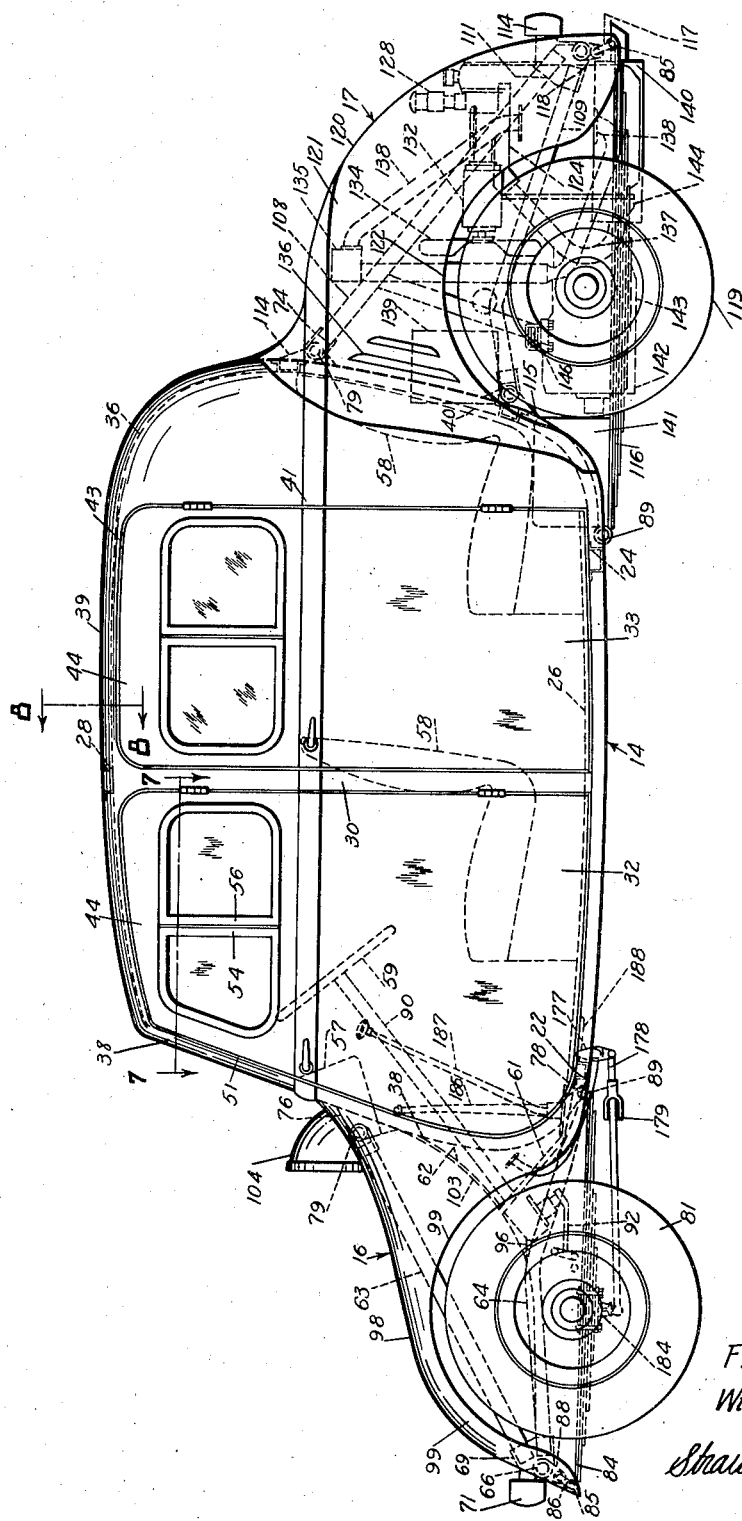
Figure 1 is a view in elevation of a vehicle embodying our invention.

Referring to Figure 1 of the drawings, the novel vehicle shown thereon is constructed of separate interchangeable unit sections, the body 14 of the vehicle comprising one section which is carried between the front section 16 and the rear section 17, these latter unit sections to be described in detail hereinafter. The forward unit 16 in vehicles embodying the present invention will, for pleasure vehicles and other vehicles devoted to the carrying of passengers, be provided with steerable road wheels and the appurtenant steering gear mechanism. The rear unit of such vehicles will carry the driving motor and the driving mechanism, the latter being preferably of the novel form disclosed herein.

As illustrated by Figure 1 of the drawings, the entire vehicle is of streamlined construction and the contours of the body section 14 contribute to the streamlined appearance of the vehicle. To this end, and also in order that the body may be constructed as a self supporting unit, the framing for the body section 14 is such as to outline a body having a streamlined configuration which is light but strong and of substantial rigidity.

The frame of the body 14 comprises lower longitudinal channel members 19 and 21 which in conjunction with the cross channel members 22, 23 and 24 form the support for the floor 26. The sides and roof of the body are reinforced by the bowed channel member 28 (Figure 1) which forms the front door posts 30 at each side of the body on which the front doors 32 are hinged. The ends of the channel member 28 may be connected in any suitable manner to the cross channel member 23. A similar bowed channel member 28, not illustrated in detail, forms the door posts for the rear doors 33.

The rear end and roof of the body section 14 is defined by the channel members 36 which are spaced one on each side of the longitudinal center line of the body and extend continuously from the transverse member 24 to the upper ends of the front corner posts 38 to which they are connected in any suitable manner as for example, by a windshield framing member connecting these posts.

The roof 39 preferably of sheet metal is carried by the frame members 28 and 36 and preferably extends downwardly to form the back and side coverings of the body section. The roof, back and sides of the body therefore form an outer metallic shell which is spaced from the inner metallic shell 40 of the body frame members. These inner and outer shells are welded or riveted together making an extremely light, strong box type section and eliminating the heavy reinforcements heretofore used in metal bodies. A belt rail 41 interrupted at each of the posts 30 and the framing members 36 adds stiffness to the body and an ornamental appearance may be imparted by making the body sides and the door coverings slightly convex outwardly over the belt rail.

Front door frame members 42 (Figure 7) are secured in any suitable manner to the roof plate 39, the post 38 and the door post 30. Similar door frame members 42 are provided to surround the rear doors 33 and are secured to the front and rear door posts 30 and the roof plate 39.

It will be noted that the doors 32 and 33 extend to the floor 26 which lies substantially in the horizontal plane of the axis of the road wheels thereby eliminating the need of a separate running board or other step to assist passengers entering and leaving the vehicle. The body 14 is made relatively wide as compared with the width of motor vehicle bodies of the conventional type which are supported on a separate chassis carrying the driving mechanism. This added width in conjunction with the low floor made possible by reason of the absence of driving connections passing beneath the body affords a comparatively large passenger carrying space without sacrifice of compactness of the vehicle as a whole.

To aid passengers in boarding and alighting from the vehicle of our invention when the body section 14 is constructed with a low roof as shown, the doors 32 and 33 extend upwardly and are curved inwardly to follow the line of the inwardly curved body side and the downwardly curved roof. The door openings extend into the sloping edge of the roof as indicated by the reference character 43 to accommodate the inwardly curved tops 44 of the door 32 and the door 33.

A weather and leak proof seal and drainage channel is provided around each door by the flexible strip 46, Figure 7, which is cemented or otherwise secured for example, by means of screws 47 to the chamfered corner of the door frame member 42. The free edges of the flexible strip 46 press against the inner surface of the flanges 48 and the edge 49 of the door. By the construction just described, a primary drainage channel 51 is formed at the top and sides of each door which collects water draining from the roof and conducts it around each side of the door, discharging it at the bottom of the door. This primary drainage channel is effective when the door is open to prevent roof drainage water from dropping on the edge of the body floor.

When the door is closed, a secondary drainage channel 52, formed by contact of the inner free edge of the strip 46 with the edge 49 of the door, takes care of any moisture which may leak past the seal which is provided between the outer free edge of the strip 46 and the flange 48 of the door.

It will be seen that by the novel means just described, water is prevented from entering the vehicle when the doors are opened, the excess water which is accumulated on the roof being conducted along the channel 51 beneath the floor of the body where it is discharged. When the doors are closed, the drainage channel 51 serves in the manner just explained to drain the water flowing from the roof which prevents it from obstructing vision by flowing over the glass in the door. The edges of the flexible strip 46 in the closed position of the door, seal the door against entry of moisture at two places which extend continuously along the top and sides of the door.

The box-like structure of the doors provided by the double walls as shown in detail by Figures 7 and 8 adds materially to the strength of the body.

Windows of the vertically hinged type are provided for each of the doors comprising sashes 54 and 46 which may be swung about pivots at their top and bottom edges to provide for ventilating the interior of the body. The sashes 54 in the forward doors 32 conform in outline to the front edge of the door. It will be understood that either or both of the window sashes may be of the vertically sliding type or if desired, the window opening may be closed by a single vertically movable glass. An instrument panel 57 provides a support for the usual indicating instruments.

The interior of the body unit 14 is provided with passenger seats 58 which are disposed oppositely the front and rear doors in such a manner as to afford easy access to the seats. The forward seat which accommodates the driver is set so that the steering wheel 59 and the vehicle controls to be described hereinafter are comfortably within reach. The sloping front of the body affords ample leg room for passengers in the front seat and the extremely wide forward door opening enables the driver and other occupants of the front seat to step into and out of the body without stepping in a cramped position. The rear seat is located forwardly of the axis of the rear wheels which aids in assuring a comfortable ride. A floor plate 61 is supported at its forward edge by an apron 62 and affords a sloping foot rest for the driver and front seat passengers.

As was previously explained, the body unit 14 is exceptionally wide because of the low floor which permits elimination of the usual running board or auxiliary step and, therefore, the seats 58 may be of sufficient width to accommodate three or more passengers.

The body unit 14 just described in detail may be completely assembled, painted and provided with interior fittings and trim at the place of manufacture so that it may be shipped to the place of assembly with a front and rear unit 16 and 17 to form a complete vehicle or to replace another body unit which is to be removed for repairs or some other purpose.

The forward unit section 16 of our novel vehicle in the embodiment illustrated by Figures 1 to 8 of the drawings comprises a frame made up of upper and lower side members 63 and 64 on each side of the unit and a transverse member 66. The frame members 63 and 64 are connected at one end in any suitable manner as by bolts 67 to an arm 68 of the bracket member 69. Each end of the transverse member 66 is secured in an aperture in the members 69 whereby the member 66 serves as the principal cross member of the frame for the unit 16. The vehicle bumper 71 is secured by bolts 72 to the vertical face 73 of the members 69.

The rearwardly directed free end of each of the frame members 63 and 64 is provided with an apertured fitting 74 which is preferably provided with a noise and vibration insulating bushing of rubber or other suitable material. A pair of brackets 76 (Figure 1) on the body section 14 provides for connection of the upper frame members 63 of the unit 16 to the central or body unit 14. The lower frame members 64 are likewise connected to brackets 78 on the body section located on the cross member 22 in the example illustrated. A bolt or pin 79 passes through the apertures in the bracket 76 and the aperture in member 74 and the members 64 are secured in a similar manner to the brackets 78.

The road wheels 81 are pivotally connected for steering movements to the drop axle 82 upon which are mounted the vehicle springs 84 provided at each end thereof with the usual spring eyes 85. The forward end of each of the springs 84 is interconnected by a shackle 86 with the downwardly depending arm 88 formed on each of the bracket members 69. The rear ends of the springs 84 are adapted for interconnection with the body unit 14 which is provided with fittings 89 for this purpose secured to the transverse frame member 22. The spring eyes 85 are preferably provided with shock and vibration insulating bushings in the manner described in connection with the attachment of the frame members 63 and 64 to the body unit.

A steering mechanism 90 commonly referred to as a steering gear, is mounted on the unit 16 for controlling the steering movements of the steerable road wheels 81, the pitman 91 of the steering gear being connected by means of the link 92 to a steering arm 93 on the stub axle 94 of the right hand road wheel. A steering tie rod 95 connects the right hand and left hand road wheels for simultaneous steering movements. The housing of the steering gear 90 is supported by and is fixed to the lower frame member 64 by any suitable means, for example, a bracket 96. As previously described, the steering column rises within the body section 14 when the latter and the unit 16 are in assembled relationship with the steering wheel 59 conveniently within reach of the operator.

The unit 16 is enclosed by a housing 98 which conforms in outline to the streamlined design of the body section 14 and continues the lines thereof in a manner to produce a graceful and pleasing appearance. In this manner the resistance encountered by the vehicle as it moves through the air is materially reduced. The attainment of this desirable result is made possible by the novel structure described in which the frame members 63 and 64 are disposed in position to permit the housing 98 to be given any desired form. The depending side edges 99 of the housing serve as fenders or mud guards and extend back substantially to the forward edges of the doors 32.

A depression 101 is provided in the center of the housing 98 between the frame members 63 which is well suited to carry a spare tire and articles of baggage. A hinged ventilator 102 in the upwardly sloping wall 103 of the depression 101 provides a means for supplying fresh air to the interior of the body section 14 of the vehicle. Vehicle headlights 104 may be conveniently disposed on the top of the housing 98 at each side of the depression 101. If desired, the depression 101 may be enclosed by a hinged cover conforming in outline to top of the housing 98 to conceal the baggage compartment and impart a full streamlined appearance to the forward part of the vehicle. To enhance this appearance the forward portion of the housing 98 may be formed to provide a unitary housing for the headlights and other auxiliary lighting equipment, if desired.

The extreme forward end of the housing 98 covers the forwardly projecting portions of the brackets 69 which support the mud guard and is secured thereto by the bolts 72. The rear edge of the housing which contacts with the body unit 14 is preferably provided with a lining of sound and vibration deadening material to prevent rattling and the transmission of noises to the passenger compartment.

The foot plate 61 previously described which is supported by the forwardly extending apron 62 lying closely adjacent to the wall 103 may, if desired, be utilized to support the steering gear 91. With this arrangement of the parts, the steering gear will remain on the body unit 14 when it is detached from the front section 16. To facilitate disconnection of the units, the link interconnecting the pitman 91 with the road wheels may be detached therefrom leaving the unit 16 free for removal after pins 79 have been removed from the brackets 76 and 78 and the spring eyes.

The rear unit section 17 of the embodiment of the invention illustrated by Figures 1 to 8 of the drawings is constructed to support the driving motor and its associated power transmission mechanism for imparting driving force to the vehicle drive wheels in a compact manner and to the rear end of the body section 14. Referring to Figure 5 of the drawings which illustrates the details of the frame of one form of this unit suitable for connection to the body section 14, upper frame members 108 in conjunction with lower frame members 109 at each side of the unit form the principal longitudinal parts of the frame. The frame members 108 and 109 at each side of the unit are connected at one end to a bracket 111 similar to the bracket 69 previously described, except in details of arrangement of the projections: A transverse member 112 is secured at its ends in apertures in the brackets 111 and completes the framework of the unit. The rear vehicle bumper 114 is secured in the manner described in connection with the bumper 71 to the brackets 111.

Apertured fittings 74 are secured to the ends of the frame members 108 and 109 and as previously explained, these fittings preferably include noise and vibration insulating bushings. The fittings 74 on the upper frame members 108 are adapted for connection by means of bolts or pins 79 to brackets 114 secured on the body unit 14 and in a like manner the brackets 115 provide for connection of the frame members 109. The springs 116 are connected at their rear ends by means of shackles 117 in engagement with the spring eyes 85 to downwardly extending arms 118 on the brackets 111. The forward ends of the springs are adapted for connection to fittings 89 of the kind previously described, which are provided on the body section 14 for this purpose. The spring eyes are preferably provided with resilient bushings to prevent vibration and transmission of noise. With the body unit forming the main section of the vehicle, stresses are relieved by using relatively long springs as shown and connecting the front and rear springs at points spaced inwardly from the ends of the body. The front and rear sections are thus balances in themselves. The vehicle wheels 119 are connected to the springs 116 in a manner to be described hereinafter in connection with the drive mechanism.

A cover 120 houses the rear unit 17 and is formed like the cover 96 to complete the streamlined appearance of the vehicle as a whole. The cover 120 projects over the rear road wheels 119 and the sides 121 thereof are cut out as indicated by the reference character 122 to expose the wheels. The sides 121 of the cover serve as mud guards to prevent splashing of dirt and mud from the wheels. As the sides 99 of the front cover and the sides 121 of the rear cover are substantially flush with the sides of the body unit 14, the conventional running board is unnecessary to aid in preventing the wheels from splashing the side panels of the body section.

The framing parts of the rear section 17 just described are similar to the corresponding parts of the front section 16 except that the spacing and location of the framing members will vary with the type of power plant and final drive selected for propelling the unit type vehicle of this invention. One form of engine and drive according to our invention is illustrated in Figures 1 and 2 of the drawings and this form will now be described in detail in connection with a further description of the rear unit of the form shown by Figure 5.

The engine and drive mechanism are constructed as a unit which is readily adapted to the frame of the rear unit which has been described. The engine 124 disclosed by Figures 1 and 2 is of the multicylinder type having the cylinders arranged in opposed banks 126 and 127 and in which the auxiliary apparatus indicated generally by reference numeral 128 is disposed at one end of the engine. A shaft 131 extends from this auxiliary apparatus to drive a generator 132 or other piece of equipment and a fan 134 which cooperates with an engine cooling radiator 135, the current of cooling air for which is drawn in through louvres 136 in the cover 120.

Suitable conduits 138 serve to conduct the cooling liquid to and from the jackets of the cylinder banks 126 and 127.

Exhaust gases from the engine cylinders are conducted by the exhaust pipes 137 to the mufflers 140 which may be conveniently located beneath the engine at each side of the rear unit 17.

The fuel tank 141 carried by the body unit 14 and disposed beneath the rear seat 58 thereof supplies fuel to the engine 124 by way of a suitable conduit connection and vacuum tank or fuel pump device. The vehicle battery 139 which cooperates with the generator carried by the engine in the usual manner to supply current for starting and lighting purposes is supported from the frame members 108 of the rear unit 17 in a convenient position for testing and filling.

The engine 124 and the apparatus auxiliary thereto is conveniently accessible upon removal of the cover 120 or a hinged portion thereof which permits minor adjustments and repairs to be made with the least possible effort.

The transmission mechanism is housed in a casing 142 which is connected to or formed integrally with the casing 143 of the differential. The casing 143 is secured to the bell housing 144 which encloses a clutch for disconnecting the engine 124 from the transmission mechanism when the effective speed ratio of the gears thereof is to be changed. The engine 124 is connected at its end opposite the housing 144 to the transverse frame member 112 by a ball and socket joint 145 or other equivalent device. The transmission casing 142 is supported by a spring 146 which is secured at each end to brackets 147 fixed on bars 148 carried by the frame members 108 and 109. The flexible joint 145 permits movement of the engine and associated drive mechanism as the spring 146 yields to cushion shocks imposed by the road surface.

Figure 6:
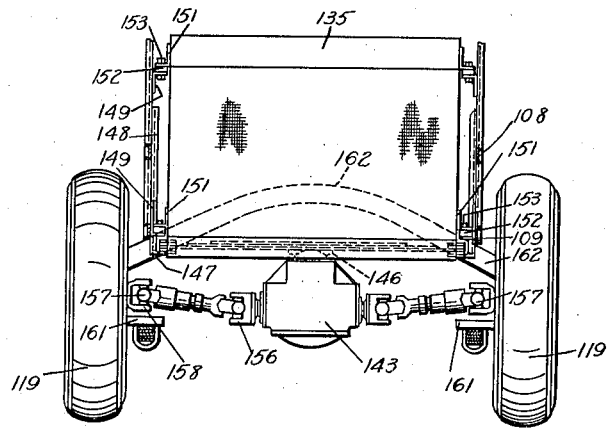
Figure 6 is a partial section of the rear unit of Figure 5 taken on line 6—6 and illustrating details of connection of certain of the members.

The engine cooling radiator 135 is supported from the frame members 108 and 109 in the manner illustrated by Figure 6 of the drawings. An angle bracket 149 is secured to each of the top frame members 108 and cooperates with a similar bracket 151 secured on each side of the shell of the radiator. A pad 152 of resilient material serves to cushion the radiator and a bolt 153 or equivalent fastening means passes through the brackets 149 and 151 to secure the upper part of the radiator in place. The radiator is connected at its lower end to the frame members 109 in a similar manner. The lower brackets 149 are inverted and extend downwardly from the frame members 109 to lie beneath the brackets 151.

It will be seen that the entire weight of the engine 124 and the associated mechanism including the transmission and differential is spring supported by the vehicle springs 116 and these elements move with the frame structure of the unit 17 when the springs 116 flex in absorbing road shocks. This movement is permitted by the flexible driving connections 156 and 157 which are interposed between the differential mechanism and the rotating drive axles 158 of the wheels 119. The wheels 119 are interconnected to the vehicle springs 116 by members 161 which project from the stationary wheel bearing support beneath the axles 158. A cross beam or dead axle 162 extends over the differential casing 143 and is secured at each end in any suitable manner to the stationary wheel bearing supports.

The controls for the engine and transmission members just described may be carried by the body unit 14 as part of the equipment thereof with suitable detachable connections extending from each control lever to the mechanism operated thereby. Figures 1 and 2 of the drawings disclose diagrammatically an arrangement of these connections in one form. The clutch is controlled by a pedal 164 secured to a sleeve 166 which is rotatably mounted in a bearing bracket 167 located beneath the floor 26 of the body unit 14. The pedal extends upwardly through a suitable slot in the floor board 61 to be comfortably within reach of the driver seated on the forward seat 58. An arm 169 extends upwardly from the sleeve 166 and exerts a pull on a rod 171 connected to the clutch operating means when the pedal 164 is depressed.

The vehicle brakes operating on both wheels of each unit are controlled by a pedal 172 secured to a shaft 173 rotatably mounted in the sleeve 166 and in a bearing bracket 174 secured beneath the floor 26. A pair of oppositely extending levers 177 are connected to pull rods 178 which exert a pull on the equalizer links 179 and 181. Brake pull rods 182 and 183 are connected to the ends of the links 179 and 181 and to brake operating levers 184. A hand brake lever 186 is connected by a suitable lost motion linkage to rotate the shaft 173 for the purpose of applying the brakes independently of the foot pedal 172.

The change speed mechanism of the transmission device is controlled from the hand lever 187 by means of shift rods 188 and 189 which enter the casing 191 located beneath the floor of the body unit. The shift rods 188 and 189 are preferably provided with couplings 192 of any suitable type in order to permit disconnection when the rear unit 17 is to be detached from the body section.

From the foregoing description, the operation of the vehicle embodying our invention will be readily understood. Each of the separable units is complete in itself and interchangeable with like units when inspection and repairs are necessary. Where a number of the vehicles of our invention are operated as a fleet by a single owner, in case adjustment is required in mechanism of either of the sections 16 or 17, these can be replaced by a repaired and tested unit. A single vehicle may be made to serve as a passenger or a commercial car by providing a separate unit 14 fitted for the carriage of merchandise, in packages or in bulk. The freight carrying unit would be available for interchange with the passenger carrying unit and, therefore, an all purpose vehicle would be provided involving a relatively small initial investment.

Figure 9 illustrates a modified form of engine and drive mechanism according to our present invention installed in a driving unit 17 similar to that illustrated by Figure 5 of the drawings. Referring to Figure 9, it will be seen that the engine 124 is similar to that already described in connection with Figures 1 and 2 of the drawings but it will be understood that any type or size of engine of suitable capacity may be employed.

The housing 198 is bolted on or otherwise secured to the engine 124 beneath the crank case and operatively houses the differential mechanism and carries supporting bearings for the drive shaft 199 which imparts driving power to the road wheels through the differential mechanism and a drive arrangement similar to that previously described in connection with Figures 1 to 8 of the drawings. A bell housing 201 which encloses a clutch device 202 is bolted on or otherwise secured to the casing of the engine 124. A housing 203 for the change speed mechanism indicated generally by the reference character 204 (Figure 10) to be described more in detail, is supported from and secured to the housing 201 in any suitable manner.

It will be seen that the engine together with the three housings just described form a compact unitary drive and transmission mechanism which may be installed in a front or rear wheel drive vehicle of any description and will occupy less space for a given engine power than any of the known forms of driving mechanism. The compact disposition of the parts makes it possible to use vertical cylinder engines in rear motored vehicles. This unitary drive and transmission mechanism is especially suited for installation in vehicles embodying our present invention as shown by Figure 1 of the drawings. The drive shaft 199 is substantially horizontal and the engine 124 is inclined at approximately 20°. This arrangement raises the rear end of the engine crank high enough to permit a large fan 206 to be mounted directly on the crank shaft for cooperation with a cooling radiator 208. The angularity of the radiator 208 allows the cover 120 to be applied without interference.

The housing 203 for the change speed transmission is accommodated beneath the rear seat 58 of the body unit where it does not interfere with the passenger carrying space or the passenger seating arrangement. The body unit may, therefore, be substantially identical with the body unit 14 of Figure 1 of the drawings, the fuel tank being divided or arranged to permit the projecting housing 203 to extend within the limits of the unit.

The transmission mechanism best shown by Figure 10 comprises a series of bevel gears 208 carried by a shaft 209 which is rotatably supported in suitable bearings 210 in the housing 203 and is operatively connected to the driven member of the clutch 202. Disconnection of the engine from the shaft 209 is effected by means of a clutch operating shaft 212 and suitable control mechanism associated therewith. The gears 208 are in mesh with a series of bevel gears 213 carried by a shaft 214 mounted at an angle to the shaft 209 in bearings 215 in the housing 203. The shaft 214 is operatively connected to the shaft 199 by means of a suitable coupling device 216. Power is transmitted from the shaft 209 to the shaft 214 through a single gear 208 and a single intermeshing gear 213 which may be selected by means of sliding keys or by dogs of the type to be described in connection with Figure 11 of the drawings. Reversal of the direction of rotation of the shaft 214 may be accomplished by a suitable idler pinion connection to a fourth gear 208 and a corresponding gear 213 on the shaft 214.

The operation of the form of engine and drive mechanism disclosed by Figures 9 and 10 and the advantages attending its use in front and rear drive vehicles will be apparent from the foregoing description. The compact arrangement of the mechanism adapts it to use in vehicles of the present invention for driving the self contained power units thereof.

Figure 11 of the drawings illustrates another modification of the engine and drive mechanism according to our present invention which differs from the form of Figures 9 and 10 principally in the relative location of the clutch device forming a part of the vehicle drive system. The drive mechanism disclosed by Figure 11 also permits the use of a unitary crankcase and transmission housing. The differential may also be housed in the combined crankcase and transmission housing as will appear from the following description. Referring to Figure 11, the engine (not shown in the figure illustrated) may be similar in type to the engine illustrated in Figure 9 of the drawings or it may be of the vertical cylinder or V type. The crank shaft 219 of the engine is supported at one end by the bearing 221 which may be one of the usual crank shaft bearings carried by supports, not shown, as their structure is known to those skilled in the art.

A shaft 222, which may be a continuation of the engine crank shaft 219 as shown, extends through a hollow gear cluster shaft 223 and is provided with a threaded extension 224. A flywheel 225, recessed as indicated by numeral 226 to provide a housing for the clutch 227, is keyed or otherwise secured on the end of the shaft 222 for rotation therewith. A nut 228 threaded on the extension 224 retains the flywheel 225 against accidental endwise removal from the shaft 222.

A bearing 229 rotatably supports the shaft 223 and the nested shaft 222 on the housing 231 which in the embodiment illustrated is a combined transmission housing and engine crankcase. The inner end of the shaft 223 is rotatably carried on the shaft 222 by a bearing 232 located near the crankshaft bearing 221.

The driven clutch disc 233 of the clutch 227 is splined on the end of the shaft 223 and this disc in conjunction with the clutch plate 234 serves to clutch the engine driven shaft 222 to the hollow transmission shaft 223 when these clutch parts are frictionally engaged. A cover member 236 for the clutch recess 226 within the flywheel is provided with a hub 237 sleeved on the shaft 223 and a flange which lies within a circular depression 238 formed in the external face of the flywheel.

A ring gear 239 provides a means for connecting an electric starting motor device to rotate the flywheel for the purpose of initially starting the engine.

Suitable means (not shown) are provided for separating the frictionally engaged clutch parts when the speed ratio of the transmission mechanism to be described is changed.

The change speed transmission mechanism comprises a series of bevel gears on shaft 223 cooperating with bevel gears mounted on a shaft 240 which is supported within the casing 231 on bearings 242 and 243. The shaft 240 in the specific embodiment selected for illustration is inclined with respect to the shaft 223 to impart driving power to the differential housed within the engine crankcase through the pinion 241. The pair of meshing bevel gears 244 and 246 at the left as viewed on Figure 11 constitute the direct drive or high speed connection between the shafts 223 and 240. The gear 244 is mounted on the hollow shaft 223 so as to be freely rotatable thereon while the gear 246 is keyed or otherwise secured to the shaft 240. An externally splined member 247 is secured for rotation with the shaft 223 and carries a dog clutch member 248 provided with internal teeth which are slidingly engaged with the external splines on member 247. A corresponding set of external splines 249 is formed on a lateral extension of the gear 244 so that when the splined clutch member 248 is moved to the left by a suitable shifter fork engaged in the peripheral groove 251, the member 247 and the gear 244 are clutched together causing the gear to rotate with the shaft 223. As the gear 244 is of the same diameter as the gear 246, the shaft 240 is driven at the same speed as the shaft 223 when the clutch 227 is engaged.

Gears 252 and 253 cooperate to give an intermediate or second speed drive for the shaft 240. The gear 252 is provided with external splines 254 which cooperate with the internal teeth on the dog clutch member 248 whereby the gear 252 is driven with the shaft 223 and drives the gear 253 and the shaft 240 at a reduced speed.

The arrangement of the low or third speed drive and the reverse drive is such as to prevent the possibility of simultaneous engagement. This feature insures correct operation and protects the mechanism against damage. The low speed drive from the shaft 223 to the shaft 240 is provided by a bevel gear 256 which cooperates with a bevel gear 257. The bevel gear 256 is formed on a portion of a sleeve 258 which is mounted over the shaft 223 and keyed or otherwise secured for rotation with said shaft. The remaining portion of the sleeve 258 is externally splined as indicated by the numeral 259 and receives an axially slidable dog clutch member 261. The bevel gear 257 is mounted for relative rotation on the shaft 240 and is provided with splines 262 on an extended portion of its hub for cooperation with an internally splined dog clutch member 263. The dog clutch member 263 is slidingly engaged over an externally splined sleeve 264 which is secured to the shaft 240.

For driving the shaft 240 in the reverse direction a gear 266 is mounted thereon for relative rotation and is connected by an idler gear (not shown) to a gear 267 which is formed on the sleeve 268. This sleeve is mounted for rotation on the shaft 223 and comprises a splined portion 269 which cooperates with the slidable dog clutch member 261 on the sleeve 258. Splines 271 are provided on the hub of the gear 266 for cooperation with the internally splined member 263. By moving the dog clutch member 261 to the right as viewed on Figure 11, the gear 267 will rotate with the shaft 223 and cause the gear 266 to rotate in a reverse direction. The gear 266 is caused to impart its reverse rotation to the shaft 240 by moving the dog clutch 263 to the right into engagement with the splines 271.

It will be seen that the reverse and low speed drives cannot be engaged simultaneously as the sliding clutch member 263 must be moved from one extreme to the other of its range of sliding movement to engage the low or the high speed drive. Quietness of operation of the transmission is assured by disengaging the gear 267 and the idler driven gear 266 from the shaft 223 by means of the sliding clutch 261.

In operation of the drive mechanism just described, the drive shaft 222 driven by the engine crank shaft 219 to which it is connected, drives the combined flywheel and clutch housing 225. When the clutch 227 is engaged, the clutch disc 233, through its splined connection, drives the hollow gear cluster shaft 223 upon which the driving gears and clutches of the transmission mechanism are mounted. The functioning of this mechanism in attaining the several gear ratios and reverse drive has already been described in detail and its operation therefore will be understood.

It will be understood that the clutch 227 may be of the automatic type with a one-way driving connection between the clutch disc 233 and the transmission shaft 223. This would permit easy selection of the several transmission gear ratios without use of the main clutch release.

Because of the compact disposition of the parts comprising the novel drive system just described, the engine may be of the vertical cylinder type for front or rear motored vehicles. As stated above, this is especially true of rear motored vehicles where space is so limited that height and length of the engine and drive mechanism must be kept at a minimum.

Figure 11A of the drawings illustrates a modification of the engine and drive mechanism according to our invention in which the location of the clutch device is the same as that shown by Figure 11. The drive shafts of the transmission mechanism of Figure 11A are parallel to each other and spaced on relatively close centers. This is made possible because it is not necessary to provide operating clearance between the shafts for the engine flywheel and clutch.

Referring to Figure 11A, the crank shaft 219 is connected to and drives the shaft 222 which in turn drives the hollow shaft 223 through the clutch 227 as was explained in connection with Figure 11. The bearing sleeve 232 is located near the gear 235 which drives the intermediate shaft 200 through gear 205. This intermediate shaft is rotatably carried in suitable bearings located in the end wall of the housing 231 and a partition wall which divides the housing transversely between the transmission mechanism and the space beneath the engine crank shaft.

Gears 207 and 211 are keyed or otherwise secured on the intermediate shaft and mesh with gears 217 and 218 which are rotatably journalled on the shaft 240 which corresponds to the inclined shaft 240 of Figure 11. The shaft 240 also carries a gear 220 which is journalled for rotation thereon and is in mesh with the gear 205. A pinion 241 at the end of the shaft 240 imparts driving power to the differential housed within the engine crankcase.

A sleeve 165 is keyed or otherwise secured on the shaft 240 and is provided with external splines 168. An internally splined dog clutch member 170, slidably mounted on the splines 168, provides a means for clutching either gear 217 or gear 220 to the shaft 240. Clutch teeth 175 on the hubs of the gears 217 and 220 may be engaged by the splined interior of the dog clutch member 170 when it is desired to drive the shaft 240 through the pair of gears 207 and 217 or the pair 205 and 220.

The pair of gears 205 and 220 constitute the high speed drive connection between the shafts 223 and 240. When the clutch member 170 is moved to the right by a suitable shifter fork engaged in the annular groove 251, the member 170 is clutched to the teeth 175 on the gear 220 causing this gear to impart rotation to the shaft 240. As the gear 205 is of larger diameter than the gear 220, the shaft 240 will rotate at a higher speed than shaft 200.

Gears 207 and 217 cooperate to give an intermediate or second speed drive for the shaft 240. The gear 217 is clutched to the shaft 240 by moving the clutch member 170 to left into engagement with the teeth 175 on the gear hub. The shaft 240 is thus driven at a reduced speed.

The low speed and reverse drive are provided by a combined sliding gear and clutch member 176 which is internally splined and is slidable on the splines 180 formed on a sleeve 185. This sleeve is keyed or otherwise secured to rotate with the shaft 240. Clutch teeth 190 are formed on the hub of the gear 218 so that when the gear 176 is moved to the right, the gear 218 is clutched to the shaft 240. As the gear 211 which drives the gear 218 is of less diameter than the latter, the shaft 240 is driven at a greatly reduced speed. The direction of rotation of the shaft 240 is reversed by moving the sliding gear 176 to the left into mesh with a suitable idler pinion (not shown) which is driven from the shaft 200.

Because of the novel location of the flywheel and clutch, the shafts 222 and 240 may be arranged parallel to each other and relatively close together as shown. It is thus unnecessary to make the gears on these shafts unduly large, and as the shafts are parallel, the construction is less costly because of the use of spur gears.

It will be understood that the clutch and flywheel may be disposed within the housing 231 or an extension thereof by suitably constructing the same and this may be readily accomplished by substituting for the cover plate 193 a casing extending to the left and enclosing the flywheel 225. The wall of this casing by which it is secured to the housing 231 will serve to replace the cover plate 193 which covers the bearing 242 and the bearing for the shaft 200.

When the housing just described is used to replace the cover plate 193 it will afford a means for rotatably supporting the end of the shaft 222.

Figures 12, 13:
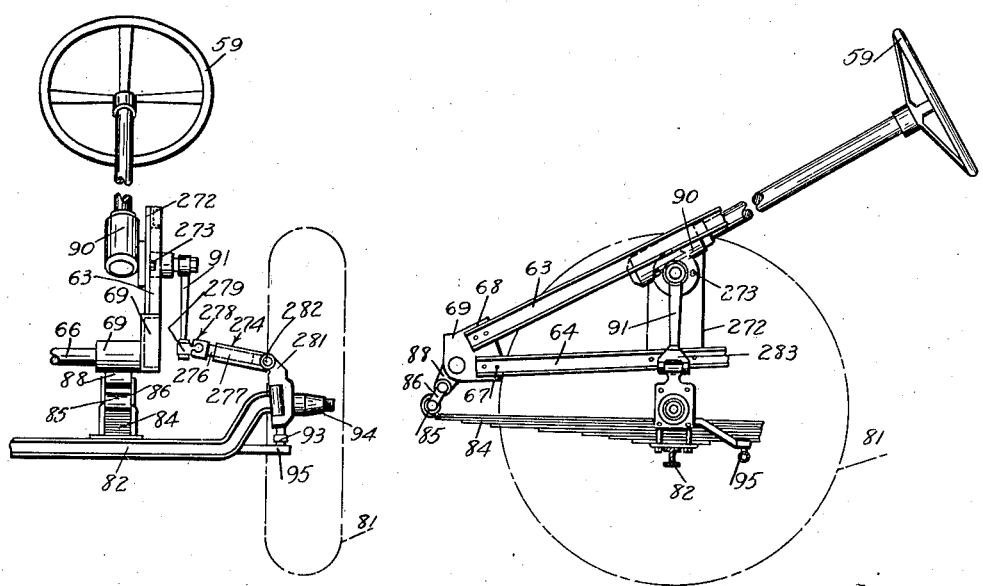
Figure 12 is a fragmentary view in side elevation of the forward part of a motor vehicle illustrating a novel steering mechanism forming part of the present invention.
Figure 13 is a front view of the novel steering mechanism of Figure 12.

Figures 12 and 13 illustrate a novel steering arrangement according to our present invention, which can be used on any vehicle, and which is especially adapted for use on the vehicle of Figure 1 or the modifications thereof to be described.

The steering gear 90, which may be of the conventional type illustrated in connection with Figure 1 of the drawings, is mounted on a plate 272 secured to the upper and lower vehicle frame members 63 and 64 by suitable bolts or studs 273 so that the pitman arm 91 swings in a vertical plane as the steering wheel 59 is turned. In the conventional type of vehicle to which our novel steering arrangement is equally well adapted, the steering gear 90 would be secured to one of the vehicle frame members, for example, to the side rail of the chassis.

The pitman arm 91 is connected to the stub axle 94 of the right hand road wheel by an extensible steering arm 274 comprised of a section 276 which slides within a section 277. The section 276 of the arm 274 is connected by means of a universally swiveling joint 278 to a fitting 279 secured on the pitman arm 91. The joint 278 may be of the ball and socket type with the end of the section 276 provided with a socket to receive a ball formed on an arm projecting from the fitting 279. A hinged connection is provided between the stub axle 94 and the steering arm 278 by means of an upstanding arm 281 which is connected by a pin 282 to the forked end 283 of the steering arm section 277.

The stub axles 94 on each end of the axle 82 are interconnected for simultaneous steering movement by a steering tie rod 95 which is pivotally connected adjacent its ends to the steering arms 93 as explained in connection with Figure 2 of the drawings.

In operation of the steering arrangement just described, when the steering gear 59 is turned, the pitman arm 91 swings in a vertical plane parallel to the longitudinal axis of the vehicle. The inner end of the arm 274 moves along as the pitman arm swings and turns the stub axle about its pivot on the vehicle axle 82. The elevation of the inner end of the arm adjacent each end of the stroke of the pitman arm is provided for by the hinged joint provided by the pin 282 and the changing angle between pitman arm 91 and the steering arm 274 is provided for by the ball and socket joint 278. In the straight ahead position of the road wheels 81, the sections 276 and 277 of the steering arm 274 are telescoped together the maximum amount. As the pitman arm 91 nears either end of its stroke, the section 276 is withdrawn from the section 277 thereby increasing the length of the arm 274.

Deflection of the springs 84 is permitted by the hinged joint at the pin 282 which is designed to allow the arm 274 to move through a greater angle with respect to the upstanding arm 281 on the stub axle than is necessary to provide for the arcuate travel of the lower end of the pitman arm 91.

The novel steering mechanism just described is simple and effective in operation and is applicable to any motor vehicle. The positive direct connection between the vehicle spring supported steering gear and the wheel carrying axle eliminates the usual drag link and the necessity for maintaining a plurality of universally pivoted steering connections in safe condition. The collapsible universally jointed steering link provided by the present invention eliminates the effect of bad steering caused by side sway and roll of the body. This trouble is encountered in narrow tread vehicles particularly when such vehicles are equipped with long flexible springs.

A modified form of vehicle according to our invention is shown in Figures 14, 15 and 16 of the drawings. This embodiment differs from that of Figure 1 principally in the engine cooling arrangement which is adapted to supply heated air to the passenger carrying compartment of the body when desired. The configuration of the vehicle as a whole differs from that of the embodiment of Figure 1 inasmuch as the combined outline of the sections is substantially continuous from front to rear of the vehicle. The proportions of the vehicle sections are selected to give the desired "tear drop" outline which is deemed to be most effective in cutting down air resistance as the vehicle travels at the higher speeds. The seating capacity of the vehicle is materially increased by reason of the body outline made possible by mounting the engine and the associated vehicle drive mechanism in a novel manner. These features will more fully appear from the description which follows and in which reference is made to the corresponding figures of the drawings.

In Figures 14, 15 and 16, the modified vehicle is illustrated with the details of construction omitted for the sake of emphasizing features which are an important part of our invention. The forward portion 285 of the vehicle slopes rearwardly to the inclined windshield 286. This forward portion 285 is rounded and extends downwardly at each side to house the front road wheels and protect the vehicle from mud and dust. To permit access to the wheels for the purpose of changing tires or performing some other operation concerned with the maintenance of the vehicle, the downwardly extending sides of the cover 285 are preferably in the form of doors hinged to the cover 285. These doors can be provided by hinging an entire panel of the cover 285 so that their outlines will be substantially invisible when viewed from the side of the vehicle. The inner sides of the wheels are guarded by vertically disposed partitions 288.

The sides of the vehicle curve inwardly near the top of the vehicle to join the rounded arched roof, the front and rear doors 287 following the curve of the sides as was previously explained in connection with the vehicle of Figure 1. The doors are sealed against the weather preferably by the novel means illustrated in Figures 7 and 8 of the drawings.

The central compartment of the vehicle is provided with seats 289 and 291 arranged to extend from the door openings on one side of the vehicle to the corresponding door openings on the other side. The vehicle between the forward openings for the doors 287 is wide enough to provide space for four of the seats 289 to accommodate four persons including the driver. The seat for the driver is placed directly behind the vehicle steering wheel 292 and the vehicle controls which are located so as to be adjacent thereto. Three seats 291 are provided between the openings for the rear doors 287 to accommodate three persons.

The rear portion of the vehicle, tapered and rounded as shown, encloses a substantially dust tight compartment or space 293 which accommodates the engine 124 and the associated mechanism for driving the rear vehicle wheels 294. The space 293 is enclosed at the bottom against road dirt and dust as indicated by numeral 295. The engine and drive mechanism is preferably combined in a single unit according to the present invention as described in connection with Figure 10 or Figure 11 of the drawings. The space 293 is enclosed at the top by a horizontal partition 296 which serves as a baggage shelf and is accessible from the central compartment above the seats 291. The space 293 is enclosed at the bottom.

An air duct or passage 297 for supplying cooling air to the radiator 299 is formed between the central portion of the rear wall 301 of the vehicle and the top wall 303 of the central compartment which slopes downwardly over the baggage carrying shelf 296. To afford a view to the rear from the central compartment, windows 304 are provided which follow the curve of the rear wall. An opening 302 in the rear wall 303 covered by a hinged door 300 provides for ventilating the passenger compartment by withdrawing stale air therefrom into the duct 297.

The radiator 299 is mounted in a partition wall 305 which extends across the rear end of the vehicle from side to side and serves as a baffle to prevent escape of air from the louvres 306 before it has passed through the radiator under the influence of the natural draft induced in the duct 297 by the forward motion of the vehicle. The flow of air through the radiator is aided by the fan 307 carried by the engine crank shaft or other shaft driven by the engine and positioned within the fan shroud 308. Coolant is added to the circulating system for cooling the engine through the radiator filling connection to which access is had from the removable cap 309.

To warm and ventilate the body a duct may be provided extending from in front of the fan 307 to the central compartment so that a portion of the warmed air which passes through the radiator 299 will be discharged into the passenger carrying space of the vehicle. The temperature of the central compartment with this arrangement can readily be controlled by varying the amount of air passed into the warm air duct or by restricting the size of the duct by a suitable valve located for convenient manipulation from the passenger compartment.

The vehicle just described and embodying our invention in a modified form is capable of comfortably seating seven passengers but, because of the novel body structure disclosed in which the passenger carrying space of the body extends from side to side of the vehicle, the vehicle is well adapted to modern traffic conditions. Its overall width is not greater than a conventional automotive vehicle of ordinary seating capacity. The configuration of the body insures minimum air resistance when the vehicle is traveling at high speeds and the distribution of the weight of the power plant and the associated drive mechanism is such as to enable the vehicle to travel at high speeds in perfect safety.

The location of the engine to the rear of the passenger carrying compartment relieves the passengers of the noise which is present in a vehicle of the conventional type. The novel cooling arrangement disclosed directs the heated air from the engine through the radiator and discharges it to the rear so that the body does not receive heat directly from the engine. Where the passenger compartment is to be heated in cold weather, the temperature can be closely controlled while at the same time insuring good ventilation.

Another modified form of vehicle embodying our invention is illustrated by Figures 17 and 18 of the drawings and differs from the embodiment of Figure 1 principally in the mounting of the springs supporting the front and rear units. Referring to these figures, the central body unit 14 is similar to the body unit described in Figure 1 and may embody substantially the same features, varied by the use contemplated for the vehicle and the modified structure of the front and rear units. The front and rear units 16 and 17 are composed of a frame work to which the springs are connected and which supports various accessories necessary to the operation of the vehicle.

The frame of the front unit 16 comprises longitudinal side members 311 and transverse members 312 suitably joined to provide a substantially rectangular frame. The rear end of each side member 311 is provided with a downwardly extending fitting 313 which receives the end of each of the springs 84. The forward ends of the springs are connected by shackles 314 to similar fittings 313 on the front end of each side frame member 311.

The unit 16 is secured in operative relationship with the body section 14 by means of apertured bracket members 316 which correspond in function to the previously described brackets 76 of Figure 1. The ends of each side frame member 311 are apertured as at 317 whereby to receive a connecting pin passing through the apertured bracket 316 when the unit 16 is assembled to the body section 14. The upper brackets on the body section are adapted for connection to the members 318 which are secured in any suitable manner to the frame members 311 of the front section. The connection of the members 318 to the brackets is facilitated by the fittings 319 which are apertured to receive a connecting pin.

The frame members of the unit 16 are concealed by a cover or housing 321 which is preferably shaped in outline to continue the lines of the body section 14 and enhance the appearance of the vehicle as a whole. The housing 321 extends over the tops of the wheels to protect the vehicle from dirt and mud and is depressed as indicated by the reference character 322 between the members 318 to provide a space for the storage of luggage. A concealing cover 323 is provided to further enhance the appearance of the vehicle and protect the articles stored in the space 322.

The rear unit 17 is composed of longitudinal frame members 324 to which the vehicle springs 116 are attached by shackles 314 at the rear and fittings 313 similar to those used in the unit 16. The frame members 324 are joined by cross members 326 secured thereto in any suitable manner. Members 327 are connected to the members 324 and an upper frame member 328 which is provided with fittings 319 for connection to the upper rear brackets 316 on the body unit 14. A lower pair of rear brackets 316 is secured in a cross member 329 of the body section for connection to the fittings 319 on the forward ends of the frame members 324.

A cover 330 serves as a housing for the unit 17 and encloses the engine and driving mechanism and is extended as at 331 to shield the tops of the wheels to prevent mud and dirt from being splashed on the body. A rear bumper 332 is carried by the frame members of the unit or the cover 330 to protect the vehicle against driving and parking hazards.

Motive power for the vehicle just described may be furnished by any one of the engine and drive systems shown on Figure 1 or 9 of the drawings or may be furnished by the modified drive illustrated.

The modified drive of Figures 16 and 17 is suitable for imparting driving power to the drive wheels of a vehicle from an engine positioned over the drive wheel axis. The engine 124 is carried by the frame members of the unit 17 in position over the driving axle 335. A clutch and transmission mechanism are contained within the housings 333 and 334 respectively, the housings being secured together in any suitable manner and carried by the body of the engine 124 to which the housing 333 is connected. Driving power from the engine 124 is imparted by way of the clutch and transmission mechanisms to the differential mechanism 336 of the drive axle 335 by a means now to be described.

A shaft 337 is driven from the engine through a universal joint 338 and drives a shaft 339 through a second universal joint 338. The shaft 339 is rotatably carried by a gear housing 341 suitably secured on the forward transverse frame member 326 of the unit 17. The shaft 339 and a shaft 342 likewise rotatably carried by the gear housing 341 are provided with bevel gears 343 whereby power is transmitted from one of these shafts to the other which is inclined with respect thereto. A shaft 344 is connected by a universal joint 346 to the shaft 342 and imparts driving power through another universal joint 346 to the differential mechanism 336.

It will be seen that the bevel gears 343 and the shafts 337 and 344 provide an effective arrangement which is free from complications for operatively interconnecting the spring supported engine 124 and the rear drive axle 335 which is directly supported by the vehicle drive wheels. The forwardly extending portion of the vehicle drive including the gear housing 341 and the shafts 337 and 344 is disposed within the recess 347 of the body unit 14 when the driving unit 17 is assembled thereto.

Figures 19 and 20 of the drawings illustrate another modified form of vehicle embodying our invention which is similar in appearance to the embodiment previously described in connection with Figures 14 to 16. The seating arrangement and location of the power plant and accessories is essentially the same as that described in connection with Figures 14 to 16 of the drawings.

Referring to Figure 19, it will be noted that modified vehicle is made up of two separable sections 349 and 351. The forward section or unit 349 includes the driver's compartment within which are placed the seats 289 accessible from the doors 32. This unit is carried by the dirigibly mounted road wheels 81 which are mounted on an axle interconnected to the unit by shock absorbing springs.

The rear unit 351 is driven by the engine 124 through the associated mechanism which imparts driving power to the rear wheels 294. The engine and drive mechanism may be of the novel type described in connection with Figure 10 or Figure 11 of the drawings disposed in the manner described in connection with Figures 14 to 16 of the drawings. The rear unit 351 includes the rear portion of the passenger compartment and is provided with seats 291 accessible from the doors 33.

The dividing plane between the front and rear units is located between doors 32 and the doors 33. Because of the novel structure of the vehicle which results in elimination of the usual chassis frame, the self-supporting vehicle body may be divided at any desired point to present two complete self contained units to be joined in the fabrication of a vehicle.

These units are interchangeable with others of the same type so that where a number of the vehicles are operated in a fleet, repairs or replacements to the parts of one unit of a vehicle need not keep the vehicle out of service as the unit requiring attention may be replaced by a similar unit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A vehicle comprising three longitudinally aligned sections consisting of an intermediate section housing a load carrying space, and a pair of wheel mounted front and rear sections attached respectively to the front and rear walls of said intermediate body section, said front and rear sections being complete self-contained units including compartments fitting said front and rear walls of said intermediate section.

2. In a vehicle, a self-contained unit forming a detachable section of the vehicle, said unit comprising a frame-work having road wheels pivotally connected thereto for steering movement, said frame-work comprising a pair of light V-shaped side portions interconnected by light cross members, and means carried by said framework for imparting steering movement to said road wheels.

3. The combination of claim 2, wherein said last named means comprises a steering post secured to one of said V-shaped portions and mechanism connected between said post and said wheels.

4. A sectional automobile formed in three distinct and complete units, said units consisting of a central body unit and front and rear end units, each unit comprising a light fabricated independent framework enclosed within an individual housing, with the ends of the body framework designed for attachment to the respective frameworks of the front and rear end units, the front end unit including dirigible supporting wheels ahead of the body unit, and the rear end unit including a set of supporting wheels disposed behind said body unit.

5. In the construction defined in claim 4, steering mechanism carried by and housed within the front end unit, a power plant carried and housed by the rear end unit and connected to the wheels of the latter, and said body unit forming the sole interconnection between the end units and having a low uninterrupted floor disposed closely adjacent the level of the wheel axes.

6. In the construction defined in claim 4, the body unit framework comprising endless side structures interconnected by transverse members, with the whole cradled as a bridging structure between the end units.

7. A sectional automobile formed in a longitudinal series of distinct and complete units and including, a central load compartment, a rear power plant and a front steering mechanism, the units being separated longitudinally of the vehicle substantially in transverse vertical planes to form individual full-width sections longitudinally of the vehicle, and each unit comprising a completely finished and appointed structure designed to be readily and rigidly secured to the adjacent unit and fit against the latter as a natural longitudinal continuation of the whole thereof.

8. In the automobile construction defined in claim 7, the central load compartment comprising a fabricated body structure which serves as the sole bridging means between the front and rear end units of the vehicle.

9. In the construction defined in claim 7, said units being three in number and comprising a front end unit with dirigible wheels and steering mechanism, a rear end unit with driven wheels and a power plant, and an intermediate unit comprising a self-contained fabricated closed body interconnecting and forming the sole bridge between said front and rear end units.

10. A sectional automobile formed in a plurality of longitudinally aligned units, one of said units including a framework section, a pair of wheels and longitudinal springs each connected at one end to said framework section for supporting said framework section on said wheels, said springs being elongated sufficiently to overlap a considerable portion of the adjacent aligned unit when the units are secured together and being connected at said overlapping ends to said adjacent aligned unit.

11. In the combination defined in claim 10, said adjacent aligned unit comprising a body having a transverse seat disposed just forwardly of and below the top of said wheels and directly above the spring portions which overlap the body.

12. A sectional automobile comprising a complete self-contained front end unit including wheels, springs, steering mechanism and a framework of substantially the length of the assembled unit; a complete self-contained rear end unit comprising wheels, springs, a compartment and a framework of substantially the length of the assembled rear unit; and a body preassembled and finished as an entity and designed to serve as the sole interconnection between the front and rear end units, said body having a framework provided at its front and rear ends with means for detachable connection with said frameworks of the front and rear end units respectively.

FRANK R. FAGEOL.
WILLIAM B. FAGEOL.